H. A. HAHN.
BATTERY PLATE BURNING RACK.
APPLICATION FILED FEB. 13, 1920.
1,391,649.
Patented Sept. 20, 1921.
4 SHEETS—SHEET 1.
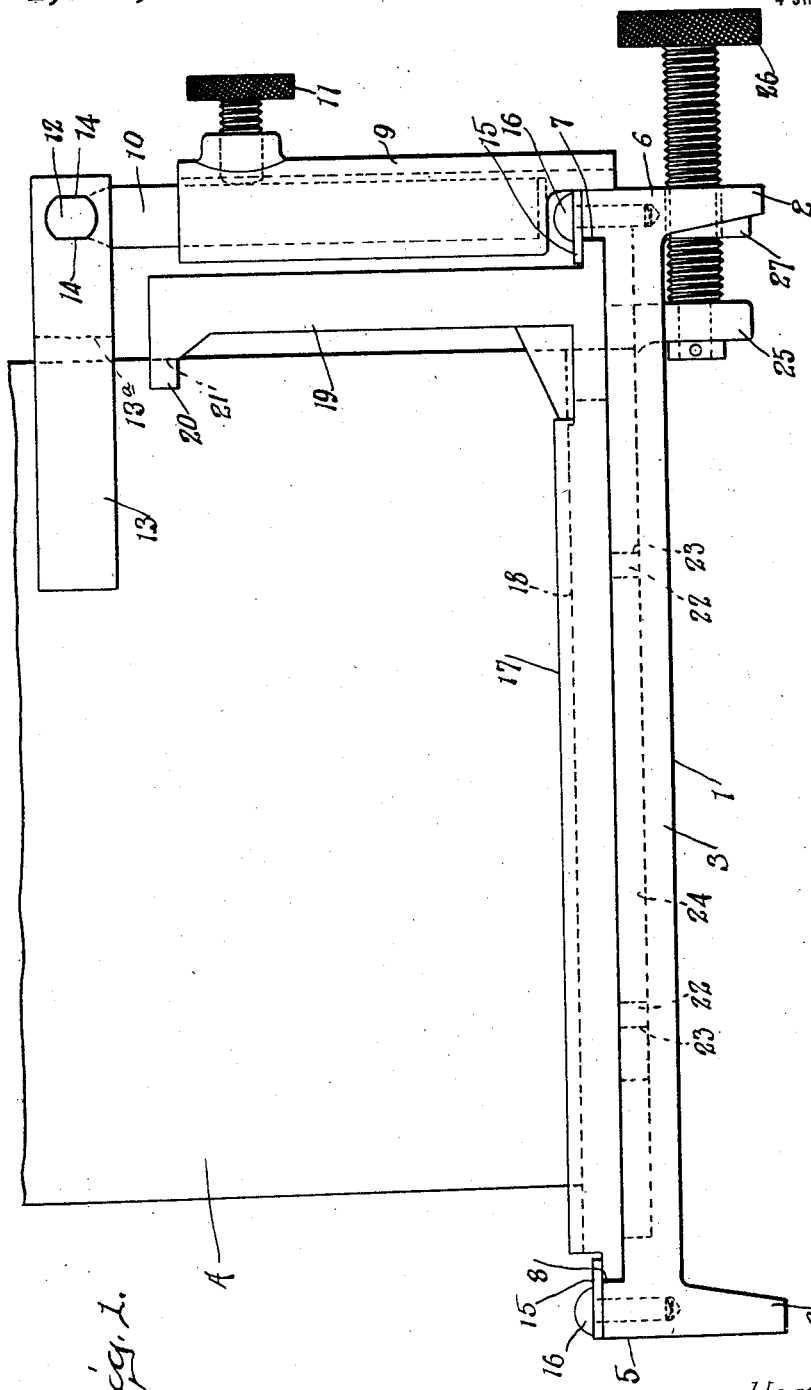
Inventor
Harry A. Hahn,
By
Toulmin & Toulmin,
Attorneys

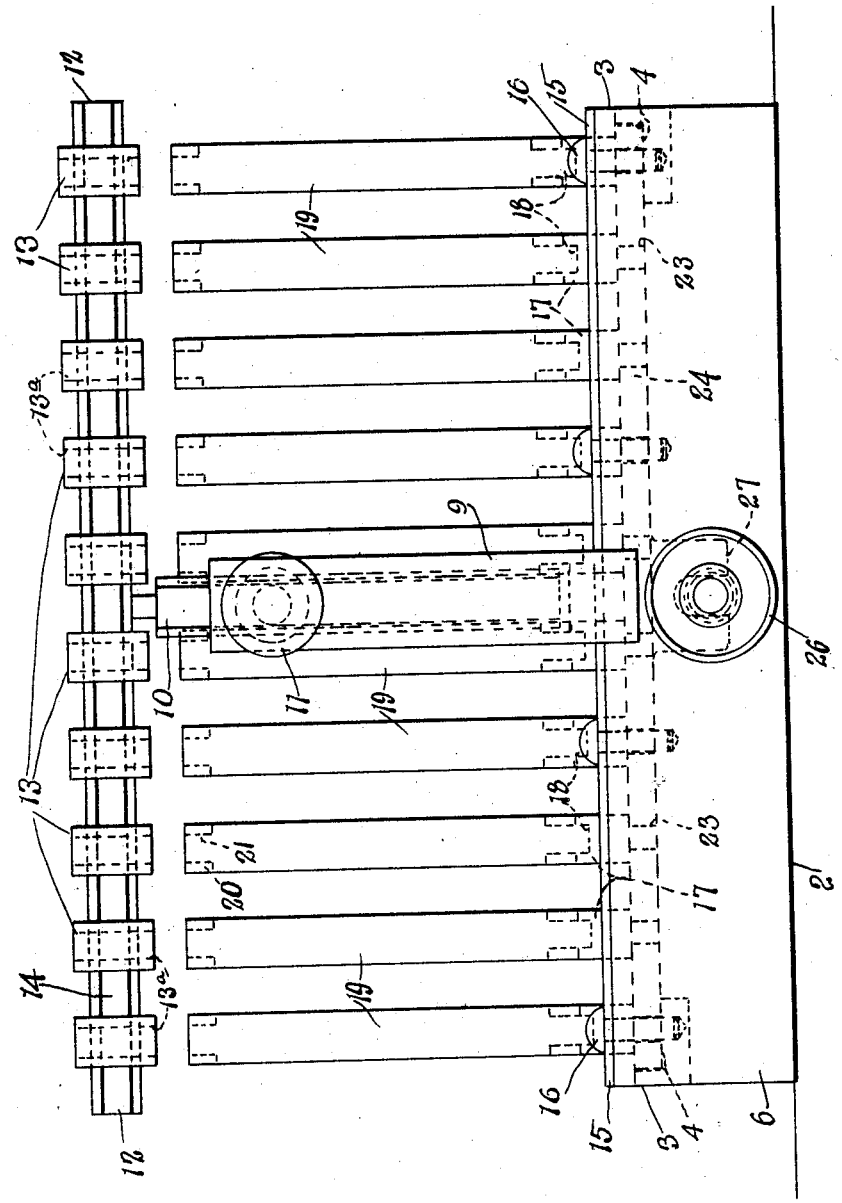

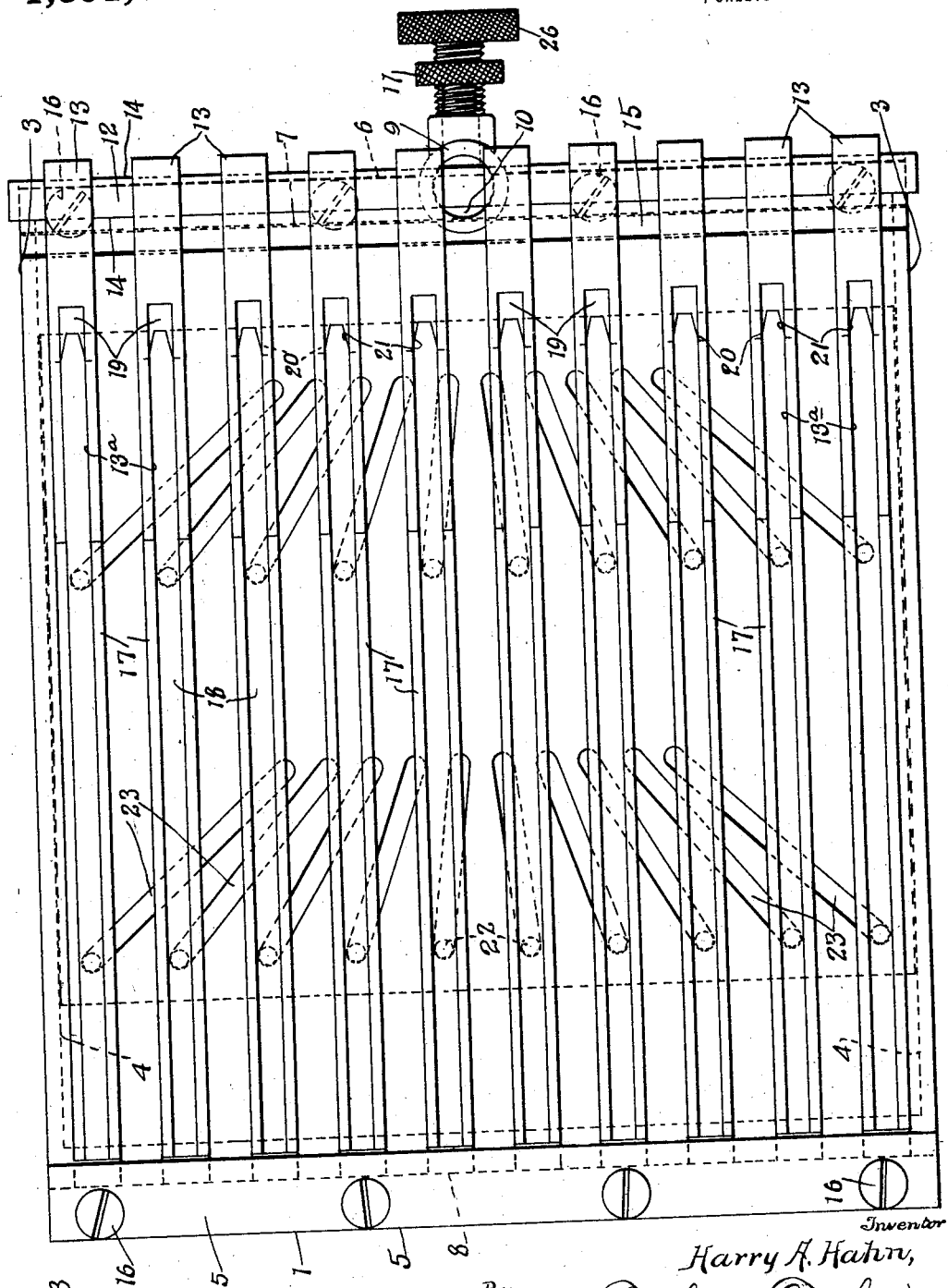

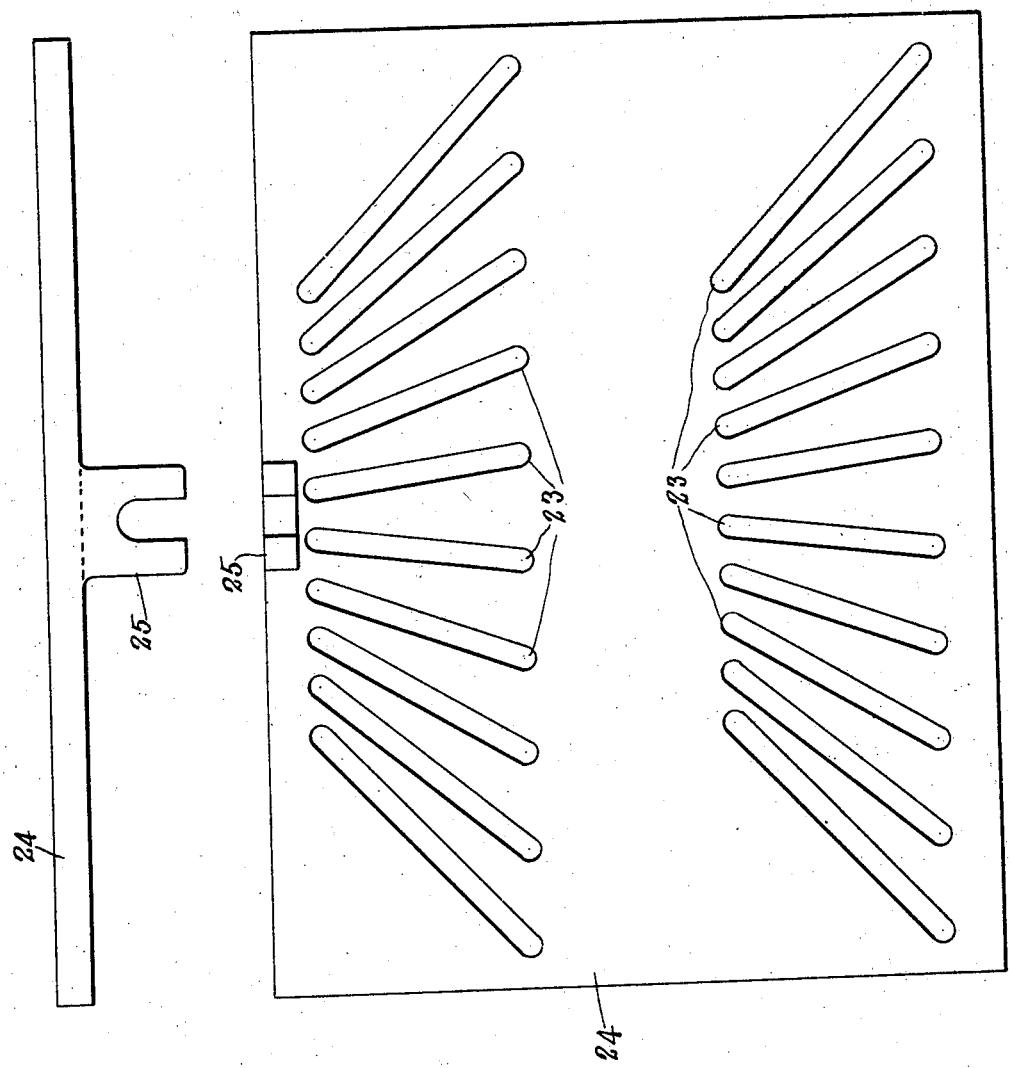

UNITED STATES PATENT OFFICE.

HARRY A. HAHN, OF GREENVILLE, OHIO.

BATTERY-PLATE-BURNING RACK.

1,391,649.  Specification of Letters Patent.  Patented Sept. 20, 1921.

Application filed February 13, 1920. Serial No. 358,520.

*To all whom it may concern:*

Be it known that I, HARRY A. HAHN, a citizen of the United States, residing at Greenville, in the county of Darke and State of Ohio, have invented certain new and useful Improvements in Battery-Plate-Burning Racks, of which the following is a specification, reference being had therein to the accompanying drawing.

This invention relates to a device for holding in compact form a series of battery plate burning racks in such a manner that they may be variably spaced, being adapted therefore to properly space the plates of different size and different makes of batteries for burning in the electrical terminals.

Various types of plate burning racks are in common use, but as far as I am aware, the present invention is the first wherein provision of any kind is made to vary the spacing of the plates and to control the adjustability of the plates with a common mechanism.

The value of the invention consists in its adaptability to a wide range of batteries, the device being practically universal in this respect.

A further advantage consists in the saving of time in the treatment of battery plates which the adjustability of the rack makes possible. The terminal connections can be burned-in in a mere fraction of the time required to perform the same operation under ordinary methods.

The improved rack is here shown in an improved form of construction for illustrative purposes. It will be understood that various modifications may be made in the details of construction and arrangement without departing from the broad underlying principle of the invention, as defined in the appended claims.

The construction as shown is preferably all metal and is especially designed for cheap production and dependable service. The parts are substantial and the operable mechanism is of a character that will not readily be rendered out of adjustment.

In the accompanying drawings:

Figure 1 is a side elevation of the improved rack;

Fig. 2 is an end view of the same;

Fig. 3 is a plan view; and

Figs. 4 and 5 are a plan and end view, respectively, of the cam plate for effecting the adjustment of the plates.

The device is supported on a stationary, rectangular-shaped, open-base frame 1 which is preferably cast integrally, and has feet 2 upon which the device is supported. The opposite side rails 3 of the frame have inwardly projecting shoulders or ways 4 formed on their inner faces and extending substantially the full length of the frame.

The end rails 5 and 6 of the frame have inwardly extending ways 7 and 8 formed on the inner face thereof and extending substantially the full length of the rails, the working faces of the ways being in a substantially higher horizontal plane than the working face of the ways 4.

A vertical frame member 9 is secured to the end rail 6 of the frame 1 in any suitable manner, here shown as being formed integrally with the frame. The vertical member is drilled vertically substantially its entire length to receive a vertically adjustable post 10 therein, a set screw 11 being secured in the upper end of the member 9 to lock the post in its respective adjusted positions.

A guide bar 12 is secured to the upper end of the post 10 and extends transverely of the frame 1, substantially in the vertical plane of the end rail 6. Mounted on the bar 12, at right angles thereto, and adapted to slide longitudinally thereon are the slotted upper coöperating plate members 13, the bar being provided with two opposite flat faces 14 and the aperture in coöperating plate members made to fit, which act to prevent rotating of the coöperating plate members thereon.

The end frame rails 5 and 6 have each secured thereto a retaining plate 15 fastened by screws 16. The coöperating plate members project over the ways 7 and 8, respectively, and act as retainers for the ends of the plate supporting racks, each rack consisting of the lower horizontal bar 17 and a vertical end bar 19, the end bar being made preferably integral with the lower bar, and being provided at its upper end with a projection 20 having a notch 21 therein and extending inwardly in the longitudinal plane of the lower bars 17.

The bars 17 are provided on their upper faces with longitudinal slots 18 and on their lower faces with studs 22 operable in slots 23 of a cam plate 24, which is slidably mounted on the ways 4 of the side rails 3, the slots 23 being inclined oppositely from the longitudinal center line of the plate. At its forward end the cam plate is provided with a bifurcated lug 25, extending downwardly from the plate and being operatively connected to the end of an adjusting screw 26, which has a threaded bearing 27 in the end rail 6.

With the turning of the screw to the right and left the cam plate will be advanced and retracted on the ways 4, and the spacing of the plate racks 17—19 will be increased and diminished, respectively, to an extent determined by the movement of the plate.

As here shown the device is adapted to receive ten battery plates A at one time. It will be understood, of course, that this showing is for illustrative purposes only and that the capacity of the device may be increased or diminished as may be desired. It will also be understood that less than ten plates may be treated in the device, the plates being arranged in any of the adjacent racks according to the number to be treated, the spacing of all the racks being substantially equal.

To treat a set of plates, the lower edges of the same are set in the slots 18 of the plate supporting bar 17, with their forward edges contacting with the notches 21 of the vertical rack member 19, the upper coöperating plate members 13 being raised sufficiently to clear the upper edges of the plates freely when the same are adjusted in the slots 18. After the plates have been adjusted in the plate supporting racks 17—19 the spacing of the plates will be effected by operating the set screw 26, a standard spacing block being used preferably to determine the proper spacing of the plates according to the type or make of the battery to which the plates belong.

With the plates properly spaced in the plate supporting racks 17—19 the coöperating plate members 13 are spaced accordingly on the transverse bar 14 so that the coöperating plate member and the plate supporting racks will be in vertical alinement. The coöperating plate members are then lowered by adjusting the post 10 until the upper edges of the plates are entered in the slots 13ª of the coöperating members 13. The post 10 is then locked in adjusted position by tightening of the set screw 11, and all the plates will be maintained in their adjusted relation, properly spaced one to another, for the burning-in operation of the electrical terminals.

This latter operation may be performed in any suitable manner and according to common practice. No novelty is claimed in connection therewith in the present invention.

From the foregoing detailed description the construction and operation of my improved burning racks will be readily understood and its advantages as a time and labor saving device will be appreciated by those experienced in this art. As herein stated, as far as I am aware, the underlying principle of the invention, i. e., the provision for variably spacing all the plates to be treated in a given operation, equally and simultaneously by a common mechanism, is broadly new in this art, as defined in the appended claims.

Having thus fully described my invention, what I claim as new and desire to secure by Letters Patent, is:—

1. In a device of the character described the combination with the frame thereof, and an operating member supported in said frame, of a plurality of plate supporting racks operable in said frame and having connections with the operating member, whereby upon the actuation of the operating member the plate supporting racks will be adjusted relative to each other, and a corresponding plurality of coöperating plate members having connections with the frame member whereby the same may be adjusted relative to the supporting racks.

2. In a device of the character described, the combination with the frame thereof, and an operating member supported in said frame, of a plurality of plate supporting racks operable in said frame and having connections with the operating member, whereby upon the actuation of the operating member the supporting racks will be adjusted relative to each other and a corresponding plurality of vertical and lateral coöperating plate members having connections with the frame member whereby the same may be adjusted relative to the supporting racks.

3. In a device of the character described, the combination with the frame thereof, and an operating member supported in said frame, of a plurality of plate supporting racks operable in said frame and having connections with the operating member whereby upon the actuation of the operating member the plate supporting racks will be adjusted relative to each other, and a corresponding plurality of coöperating plate members each independently adjustable and having connections with the frame member whereby the same may be adjusted relative to the supporting racks.

4. In a device of the character described the combination with the frame thereof, and an operating member supported in said frame, of a plurality of plate supporting racks operable in said frame and having connections with the operating member whereby upon the actuation of the operating member the plate supporting racks will be simultaneously and laterally adjusted relative to each other and a plurality of coöp- erating plate members each independently adjustable having connections with the frame member whereby the same may be adjusted vertically relative to the supporting racks.

5. In a device of the character described the combination with the frame thereof and an operating member supported in said frame, of a plurality of plate supporting racks arranged in a common plane operably supported in said frame and having connections with the operating member, and a corresponding plurality of coöperating plate members in a plane substantially parallel to the plane of the supporting racks and adjustable relative thereto, having adjustable connection with the frame member, whereby upon the actuation of the operating member the plate supporting racks will be adjusted laterally to each other and upon manipulation of said adjustable connection the coöperating plate members may be adjusted relative to the supporting racks.

6. In a device of the character described the combination with a frame thereof and an operable member supported in said frame, of a plurality of equally spaced plate supporting racks supported in said frame and means within the operating member for connecting the same with the plate supporting racks whereby upon the operation of said operable member the racks will be adjusted relative to each other to vary said spaces and a corresponding plurality of coöperating plate members each member of which is adjustable independently laterally relative to the supporting racks.

7. In a device of the character described the combination with the frame thereof, and an operating member supported in said frame, of a plurality of equally spaced plate supporting racks operable in said frame, and means within the operating member for connecting the same with the plate supporting racks, and a corresponding plurality of coöperating plate members having connections with the frame member, whereby upon the actuation of the operating member the racks will be adjusted simultaneously and unequally laterally to each other.

8. In a device of the character described the combination with a frame thereof, and a slotted operating member supported in said frame, of a plurality of plate supporting racks arranged in a common plane operably supported in said frame and having connections with the slots in the operating member whereby upon the actuation of said member the racks will be moved laterally and unequally one with respect to the other, and a corresponding plurality of coöperating plate members having connections with the frame member.

9. In a device of the character described, the combination with the frame thereof, a slotted operating member slidably supported in said frame, of a plurality of equally spaced plate supporting racks arranged in a common plane and having connections with slots in the operating member whereby upon actuation of said member the racks will be simultaneously and variably adjusted relative to each other and the equal spaces between the racks will be maintained and a corresponding plurality of coöperating plate members having connections with the frame member.

10. In a device of the character described, the combination with the frame thereof having ways formed in the opposite sides and ends thereof, a member operable in said side ways and having a plurality of oppositely inclined cam slots formed thereon, of a plurality of plate-supporting racks operable in said end-ways and having connections with said slots whereby upon the operation of said member the racks will be moved laterally relative to each other.

11. In a device of the character described the combination with the frame thereof having ways formed in the opposite sides and ends thereof and an operable member in said side ways longitudinally of the frame and having a plurality of variably inclined cam slots formed therein, of a plurality of plate supporting racks in said end ways and having connections with said slots whereby upon the operation of said plate the racks will be moved laterally relative to each other and a corresponding plurality of coöperating plate members adjustable vertically and laterally relative to the supporting racks.

In testimony whereof, I affix my signature.

HARRY A. HAHN.